United States Patent
Nikic et al.

(10) Patent No.: US 10,350,652 B2
(45) Date of Patent: Jul. 16, 2019

(54) METHODS AND SYSTEMS FOR PLASMA CLEANING A CONTAINER USING A MAGNET

(71) Applicant: The Boeing Company, Chicago, IL (US)

(72) Inventors: Dejan Nikic, Seattle, WA (US); Farrah Tan, Auburn, WA (US)

(73) Assignee: The Boeing Company, Chicago, IL (US)

( * ) Notice: Subject to any disclaimer, the term of this patent is extended or adjusted under 35 U.S.C. 154(b) by 134 days.

(21) Appl. No.: 15/289,134

(22) Filed: Oct. 8, 2016

(65) Prior Publication Data
US 2018/0099316 A1    Apr. 12, 2018

(51) Int. Cl.
| | |
|---|---|
| C25F 1/00 | (2006.01) |
| B08B 7/00 | (2006.01) |
| B08B 9/08 | (2006.01) |
| B08B 9/00 | (2006.01) |
| B25J 11/00 | (2006.01) |

(52) U.S. Cl.
CPC .............. B08B 7/0035 (2013.01); B08B 9/00 (2013.01); B08B 9/08 (2013.01); B25J 11/0085 (2013.01)

(58) Field of Classification Search
CPC ......... B08B 7/0035; B08B 9/027; B08B 9/08; B25J 11/0085
USPC ...... 134/1, 1.1; 156/345.24, 345.42, 345.49; 204/389.16, 155
See application file for complete search history.

(56) References Cited

U.S. PATENT DOCUMENTS

| | | | | |
|---|---|---|---|---|
| 6,332,484 | B1 * | 12/2001 | Stahlecker | B67C 7/0026 141/129 |
| 6,815,362 | B1 * | 11/2004 | Wong | B08B 7/0035 134/1.1 |
| 7,320,331 | B1 * | 1/2008 | Audino | B08B 7/00 134/1 |
| 8,003,959 | B2 * | 8/2011 | Platow | H01J 27/02 134/1.1 |
| 2001/0001185 | A1 * | 5/2001 | Setoyama | B08B 7/00 156/345.42 |
| 2005/0019209 | A1 * | 1/2005 | Burger | A61L 2/14 422/23 |
| 2010/0034985 | A1 * | 2/2010 | Krueger | A61L 2/14 427/579 |

* cited by examiner

*Primary Examiner* — Binh X Tran
*Assistant Examiner* — Christopher Remavege
(74) *Attorney, Agent, or Firm* — McDonnell Boehnen Hulbert & Berghoff LLP (57) ABSTRACT

An example method for plasma cleaning a container includes generating plasma flowing within the container, applying a magnet to an exterior surface of the container causing the plasma within the container to be attracted to the magnet, and moving the magnet in a motion over the exterior surface to control movement of the plasma within the container and to clean one or more areas of the container with the plasma according to the motion. An example system for plasma cleaning a container includes a power source, a gas inlet on the container for dispersing a gas within the container, and based on current flowing, the gas converts to plasma. The system also includes a robotic manipulator having an end effector coupled to a magnet to move the magnet in a motion over an exterior surface of the container causing the plasma within the container to be attracted to the magnet.

20 Claims, 6 Drawing Sheets

METHODS AND SYSTEMS FOR PLASMA CLEANING A CONTAINER USING A MAGNET

FIELD

The present disclosure relates generally to plasma cleaning a container using a magnet, and more particularly to applying a magnet to an exterior surface of the container causing the plasma within the container to be attracted to the magnet and moving the magnet in a motion over the exterior surface to control movement of the plasma within the container and to clean one or more areas of the container with the plasma according to the motion.

BACKGROUND

Some large industrial vessels must be cleaned in order to reach desired operational characteristics. Example industrial vessels include large vacuum chambers, autoclaves, pipes, and tubes. For a large vacuum chamber, an internal surface must be cleaned to reach a desired pressure so as to reduce a load on pumps and/or maintain process control of the vessel environment.

Typical residues found on interior vessel surfaces include hydrocarbon contaminants from fingerprints, oil and grease residues from screws and seals, dust and other particulates, and ambient vapors such as water that have been adsorbed into the surfaces. These residues can affect performance of the vessel and must be removed thoroughly.

Typical cleaning measures often involve a time-consuming bake out process for both internal vessel components (e.g., pumps) and a chamber of the vessel. Venting the chamber with dry nitrogen can also prevent more water vapor and other vapors present in ambient air from adsorbing within the chamber walls, but will not generally clean already contaminated surfaces.

Plasma cleaning has also been used to clean interior vessel surfaces, and involves removal of impurities and contaminants from surfaces through use of an energetic plasma created from gaseous species. Gases such as argon and oxygen, as well as gas mixtures such as air and hydrogen/nitrogen are used. The plasma is created by using high voltages to ionize a low pressure gas. The plasma formed by passage of the electric current through a low-pressure gas is referred to as glow discharge. Thus, the glow discharge can be created by applying a voltage between two metal electrodes in a chamber containing the gas, and when the voltage exceeds a certain value (referred to as the striking voltage), the gas in the chamber ionizes and becomes a plasma, and begins conducting electricity that causes it to glow with a colored light. The color depends on the gas used.

Existing glow discharge cleaning of interior vessel surfaces typically requires high voltage power sources to sustain the plasma glow discharge created within the large vessel. This type of cleaning is generally inappropriate for very large vessels due to excessive power requirements needed to create the large amounts of plasma. An example cleaning application involves maintaining a diffuse plasma mixture of energetic argon and oxygen ions that bombard the surface(s) of the chamber to be cleaned. But, the high power sources needed to sustain the plasma generation are expensive, hard to come by, and create potential safety hazards as with many high voltage equipment. The high power also requires a steady load on the equipment that will wear out the power supply over time. Thus, glow discharge cleaning may not be practical for large vessels, as the power requirements scale based on an increase in surface area of the vessel.

In addition, the diffuse plasma glow discharge cleaning process is a random process that assumes the paths of the ions will eventually bombard an entire surface needing to be cleaned. However, full coverage for cleaning based on the random paths of the ions would take a long time and is most often unachievable. As a result, typical plasma cleaning methods only support cleaning small objects, and may also not fully clean surfaces having irregular shape.

What is needed is a glow discharge cleaning process that enables surfaces to be cleaned using low power sources for full coverage cleaning.

SUMMARY

In one example, a method for plasma cleaning a container is described. The method includes generating plasma flowing within the container, applying a magnet to an exterior surface of the container causing the plasma within the container to be attracted to the magnet, and moving the magnet in a motion over the exterior surface to control movement of the plasma within the container and to clean one or more areas of the container with the plasma according to the motion.

In another example, a system for plasma cleaning a container is described. The system includes a power source coupled to an electrode positioned within the container, and a gas inlet on the container for dispersing a gas within the container. Based on current flowing through the electrode, the gas converts to plasma within the container. The system also includes a robotic manipulator having an end effector coupled to a magnet to move the magnet in a motion over an exterior surface of the container causing the plasma within the container to be attracted to the magnet to control movement of the plasma within the container and to clean one or more areas of the container with the plasma according to the motion.

In another example, another system for plasma cleaning a container is described. The system includes a power source coupled to an electrode positioned within the container, and a gas inlet on the container for dispersing a gas within the container. Based on current flowing through the electrode, the gas converts to plasma within the container. The system also includes a structure, holding a magnet, attached to an exterior surface of the container, and the plasma within the container is attracted to the magnet. The system also includes a motor coupled to the structure to cause movement of the magnet within the structure in a motion over the exterior surface to control movement of the plasma within the container and to clean one or more areas of the container with the plasma according to the motion.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, plasma glow discharge techniques are described to clean surfaces using a magnet to focus or direct the plasma cleaning. Example applications include cleaning interior surfaces of large vacuum chambers, autoclaves, pipes, and tubes. The glow discharge plasma cleaning can be used, for example, in vacuum chambers where debris would otherwise outgas into the chamber during a vacuum process. Large industrial vessels generally are cleaned to reach desired operational pressures quickly and efficiently to reduce load on pumps and/or maintain process control of a vessel environment. Typical residues found on interior vessel surfaces include hydrocarbon contaminants from fingerprints, oil and grease residues from screws and seals, dust and other particulates, and ambient vapors such as water that have been adsorbed into the surfaces.

General diffuse plasma glow discharge cleaning can be used to clean the interior surface and walls of chambers. This typically requires high voltage power sources to sustain the plasma glow discharge created and required for cleaning, and the technique involves maintaining a diffuse plasma mixture of energetic argon and oxygen ions, for example, that bombard the surface(s) of the chamber to be cleaned. The high power sources are expensive, hard to come by, and potential safety hazards as with all high voltage equipment. The high power also requires a steady load on the equipment that will wear out the power supply over time.

In addition, the diffuse plasma glow discharge cleaning process is a random process that assumes the paths of the ions will eventually bombard an entire surface needing to be cleaned, and full coverage for cleaning based on the random paths of the ions may take a long time.

Within examples, local and stable control of the plasma glow discharge is provided by use of a magnet. For example, using a magnet, motion of plasma glow discharge can be localized and controlled to maximize a cleaning effect. In addition, a plasma glow discharge can be shaped and guided to clean areas that may be inaccessible to traditional glow discharge cleaning methods by use of a magnet.

Figure 1:
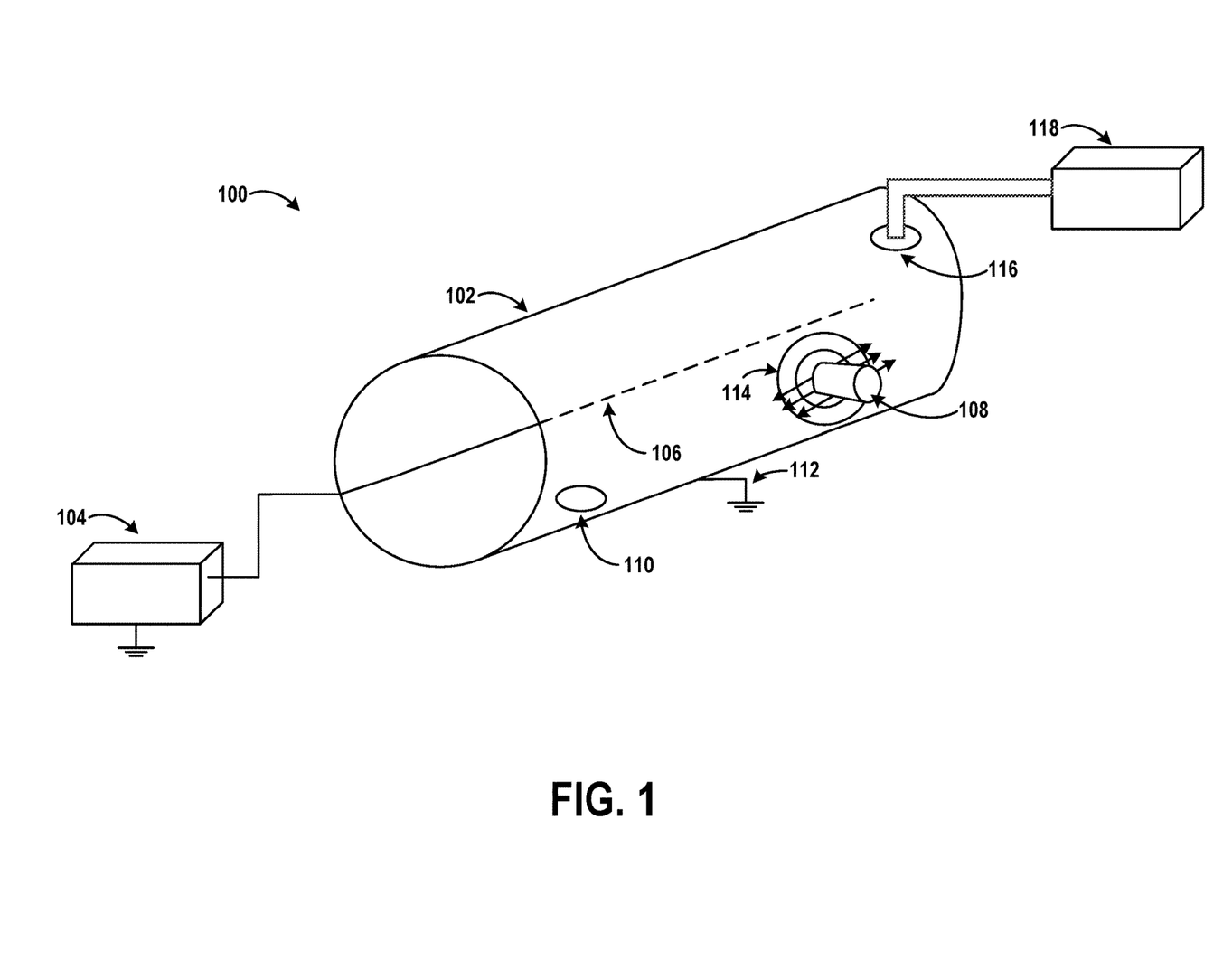
FIG. 1 illustrates an example system for plasma cleaning a container, according to an example embodiment.

Referring now to the figures, FIG. 1 illustrates an example system 100 for plasma cleaning a container 102, according to an example embodiment. The system 100 includes a power source 104 coupled to an electrode 106 positioned within the container 102, and a magnet 108. The container 102 may be a vacuum chamber, in some examples, that requires cleaning of interior surfaces over time. In other examples, however, the container 102 may be any type of structure with an enclosure that requires cleaning.

The container 102 includes a gas inlet 110 on the container 102 for dispersing a gas within the container 102. The power source 104 can apply a voltage to the electrode 106 included within the container 102, and a ground 112 is also applied to the container 102 to create a voltage differential between the electrode 106 and the container 102. Once the voltage differential is present, the gas in the container 102 ionizes and becomes a plasma. Thus, based on current flowing through the electrode 106, the gas converts to the plasma within the container 102.

The electrode 106 may include or be a wire connected to the power source 104 and mounted within the container 102. The gas used can include any type or combination of gases that may be ionized to a plasma, and examples of the gas include a mixture of an inert gas and a reactive gas. Furthermore, pressure inside the container 102 and an amount of voltage applied to cause the gas to be ionized to a plasma depends on the type of gas used. Example pressures are in a range of about 20 mTorr to about 100 mTorr, and the pressure can be reduced or increased until the plasma is observed.

The magnet 108 can be applied to an exterior surface of the container 102 causing the plasma within the container 102 to be attracted to the magnet 108. As the magnet 108 is moved in a motion over the exterior surface, movement of the plasma is controlled within the container 102 to follow the magnet 108 and to clean one or more areas inside the container 102 with the plasma according to the motion. FIG. 1 illustrates an example plasma glow 114 surrounding the magnet 108. As an example, interior surfaces of the container 102 can be cleaned in a focused manner by applying the magnet 108 to an exterior surface of the container 102 to cause the plasma to be attracted to the magnet 108, and thus, to be attracted to an interior surface of the container 102 opposite the magnet.

Using the magnet 108, the diffuse plasma glow 114 is not a random process, but rather, the plasma glow 114 is attracted to the magnet 108. The magnet 108 focuses the plasma glow 114 around the magnet 108. For example, on a 10 $m^2$ surface area chamber and a 1000 W power supply, a 100 $W/m^2$ plasma glow can be generated in the container 102 overall; however, using the magnet 108 a majority of plasma glow can be caused to go to an area around the magnet 108 that has small surface area of, e.g., 0.1 $m^2$, resulting with a 10 $kW/m^2$ plasma glow that may clean the surface area more quickly.

Thus, specific areas of the container 102 can be cleaned with confidence, rather than assuming that paths of the ions will eventually bombard an entire surface needing to be cleaned. As a result, moving the magnet 108 in the motion over the exterior surface of the container 102 controls movement of the plasma glow 114 on an interior surface of the container 102 to clean the interior surface of the container 102. The magnet 108 can be moved in the motion over the exterior surface of the container 102 in a predefined manner to cover an entire area of the exterior surface, which in effect, causes an entire area of the interior surface of the container 102 to be cleaned.

In addition, using the magnet 108 enables cleaning large containers without using large current or large power sources. In contrast, without using the magnet 108, large power sources may be needed. For example, plasma can be generated using the configuration shown in FIG. 1 with the power source 104 supplying 500 V and the electrode 106 including a 2500 ohm resistor copper wire position into the container 102 that is a vacuum chamber held between 75 to 100 mTorr. There may be a dependence on pressure and geometric configuration of magnetic field that determines an amount and shape of plasma generated. For a surface area on the order of 1 m$^2$, a current density J of 0.1 mA/cm$^2$ for adequate cleaning of the interior surface would require a 1 A current, which requires a 1 kW power supply, to generate enough plasma to clean the surface area. Such a large power supply may not often be readily available. An amount of plasma needed grows with an amount of surface area to be cleaned, and as the amount of plasma increases, an amount of power required increases too.

As another example, assume that a 500 W plasma device can clean a chamber that is 1 m cube. A surface area of the cube is 6 m$^2$, and so about 83 W/m$^2$ is needed. Taking the same plasma device to clean a 5 m cube, which has a surface area of 150 m$^2$, would require 12,450 W, which is quite large and expensive.

However, using the magnet 108 enables smaller power sources to be used since plasma is not required to envelope an entire surface area of the interior of the container 102. Rather, local and/or focused cleaning can be performed to scrub the magnet 108 across an exterior of the container 102 in any manner to internally move the plasma glow 114 around an interior of the container 102. Furthermore, the magnet 108 can be used to force the plasma glow 114 into any regions of the container 102 where the plasma may not otherwise reach, for example, such as within small cavities or pockets inside the container 102. Referring to the example above, the 500 W plasma device may be used for cleaning any size chamber or container since the plasma glow 114 can be focused and moved along inside the container to cover all areas. In addition, since the plasma glow 114 can be redirected and refocused to for a specific location and amount of cleaning needed, an amount of time to clean a chamber can be reduced.

The magnet 108 is shown as a cylindrical magnet, and in the example shown in FIG. 1, the magnet 108 includes two faces with poles on the two faces. The magnet 108 is applied to the exterior surface of the container 102 by applying one of the two faces to the exterior surface of the container, and a magnetic field is perpendicular to surfaces of the container 102.

The magnet 108 may be a permanent magnet in some examples. In other examples, the magnet 108 is an electro-magnet, and a strength of the magnet 108 can be adjusted. The electro-magnet can be configured in any shape to fit any geometry based on windings in the wire of the electro-magnet, for example.

The magnet 108 creates a directional magnetic field. A larger or stronger magnet can cover a larger surface area, or a higher magnetic field can concentrate the plasma glow 114 more effectively.

The container 102 also can include a gas outlet 116 on the container 102 for collecting contaminated gas. Thus, gas can be fed into the container 102 at the gas inlet 110, and pumped out of the container 102 at the gas outlet 116. The gas enters the container 102, is converted into plasma, flows through the container 102 in plasma form contacting the walls and knocking off debris, and exits the container 102 as a gas. The gas reacts with contaminates using different gas mixtures. For hydrocarbon cleaning to remove oils, an example gas mixture to use includes about 90% argon and 10% oxygen. When hydrocarbons are knocked off of walls, the hydrocarbons react with the gas mixture, and the contaminated gas is pumped out the gas outlet 116. A specific gas mixture to use and feed into the gas inlet 110 is dependent on a type of surface to be cleaned, or a type of contaminate to be cleaned.

The system 100 also includes a spectrometer 118 coupled to the gas outlet 116 to determine a concentration of carbon in the contaminated gas. The spectrometer 118 may be or include a mass-spectrometer or residual gas analyzer, for example. In examples, the magnet 108 can be moved to another area over the exterior surface of the container 102 to clean a different area of the container 102 based on the concentration of carbon detected by the spectrometer 118 being below a threshold concentration. In these examples, the container 102 can be cleaned in a specific manner to focus on areas where additional debris may be present. The spectrometer 118 monitors exhaust gases at the gas outlet 116, and the exhaust gases pick up all debris cleaned off of the interior surfaces of the container 102. While cleaning, a concentration of the carbon, or other debris, in the exhaust gas is expected to decrease over time, and reach a sufficiently low level. Once the threshold level is met, the magnet 108 can be moved to another area. The threshold level is dependent on a level of cleanliness needed. For example, some chambers require absolute carbon free interior surfaces, and so the threshold level is approximately 0% of carbon (+/− some tolerance). Other chambers can tolerate certain parts per million of carbon/debris to be present in chamber for desired operations.

In some examples, a measurement of the gas exhaust at the gas outlet 116 can be taken by the spectrometer 118 at a beginning of a cleaning cycle where a large amount of contaminates are expected, and again at an end of the cleaning cycle. If the concentration of contaminates decreases, the cleaning process may be completed.

While cleaning, a majority of debris seen in the exhaust gas is due to the area being cleaned proximal to the magnet 108, but can include debris knocked off walls elsewhere too. The plasma glow 114 is substantially greater in a region surrounding the magnet 108, and thus, the spectrometer 118 monitoring the gas outlet 116 is a good measure to determine cleanliness of the area surrounding the magnet 108.

In addition, a pre-cleaning manual process may be performed prior to the plasma glow cleaning process using a solvent, and afterward, an interior of the container 102 may be uniformly contaminated. Thus, the spectrometer 118 can determine an overall cleanliness of the interior of the container 102 based on a measurement of the exhaust gas.

An additional or alternative measure can include visually observing the interior of the container 102 during cleaning. In some examples, while cleaning, the plasma glow 114 generates flashes of light due to oxides being knocked off of the interior surfaces and walls, and thus, the flashes can be visually observed as another or alternative measure of cleanliness. Once little or no flashes are seen, the interior surface of the container 102 can be determined to be clean. Depending on a type of debris being cleaned, the plasma glow 114 may not generate the flashes of light though, and so the spectrometer 118 can be used in such examples.

Within examples, based on outputs of the spectrometer 118 including a concentration of carbon or other debris seen in the exhaust gas, or based on an amount of flashes of light visually observed indicating a level of cleanliness, the magnet 108 can be moved or focused on a specific area of the container 102. In examples where the magnet 108 is an electro-magnet, a strength of the electro-magnet can be increased based on the concentration of carbon seen in the exhaust gas being above a threshold concentration. Thus, the strength of the magnetic field of the magnet 108 can be adjusted on the fly such as when a concentration of the plasma glow 114 in a particular area would be advantageous to provide additional cleaning, possibly to compensate for a variation in wall thickness, for example.

Within examples, cleaning of the container 102 can be focused using the magnet 108 onto any desired areas. When the container 102 comprises multiple materials, for example a section including stainless steel and a section including titanium, cleaning may be focused on the titanium section which tends to soak in nitrogen contaminates. The plasma glow cleaning process may be performed for an amount of time needed until the concentration of contaminates seen in the exhaust gas by the spectrometer 118 is below the desired threshold amount. A time for cleaning can depend on an amount of gas flow and a pressure in the container 102 during cleaning, as well as on a type of container material, size and shape of the container 102, and type of contaminate being cleaned.

In FIG. 1, the magnet 108 may be applied manually and moved manually along the exterior surface of the container 102. Although, the magnet 108 may be moved in any way, and by any process.

Figure 2:
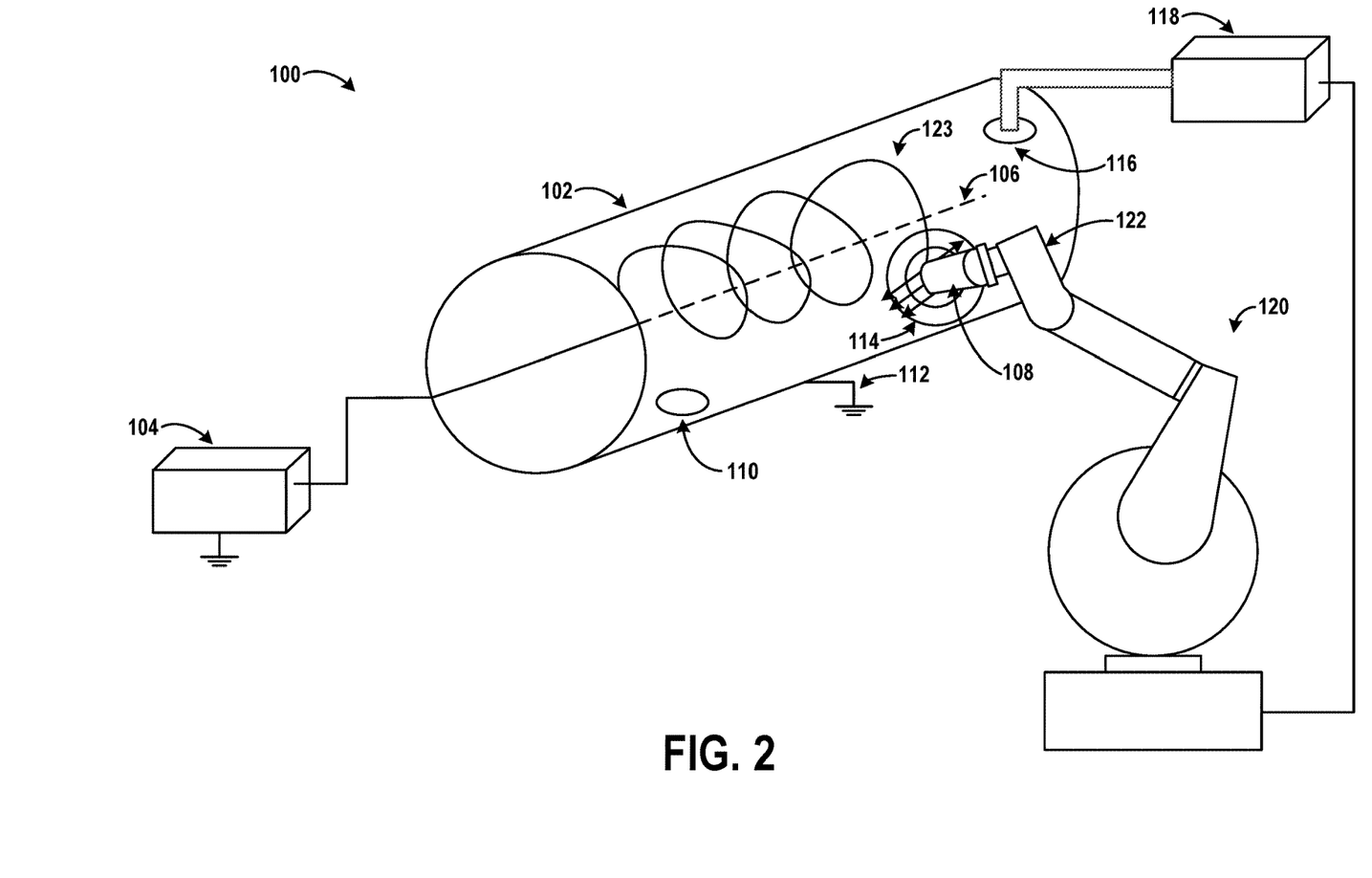
FIG. 2 illustrates another example of the system for plasma cleaning the container, according to an example embodiment.

FIG. 2 illustrates another example of the system 100 for plasma cleaning the container 102, according to an example embodiment. In FIG. 2, a robotic manipulator 120 having an end effector 122 is coupled to the magnet 108 to move the magnet 108 in a motion 123 over an exterior surface of the container 102 causing the plasma within the container to be attracted to the magnet 108 to control movement of the plasma within the container 102 and to clean one or more areas of the container 102 with the plasma according to the motion 123. In this example, the robotic manipulator 120 may be a robotic arm with the magnet 108 attached to the end effector 122, and the robotic manipulator 120 can be programmed to move in any way desired so as to cover an area or an entire surface area of the container 102.

In some examples, the spectrometer 118 is connected to the robotic manipulator 120, or coupled to the robotic manipulator 120 through a computing device (not shown), to provide information indicating a concentration of debris (e.g., carbon) in the exhaust gas. Once the concentration decreases below a threshold level, the robotic manipulator 120 may then move the magnet 108 to another area of the container 102. This enables a fully automated process for cleaning the interior surfaces of the container 102, for example.

Figure 3:
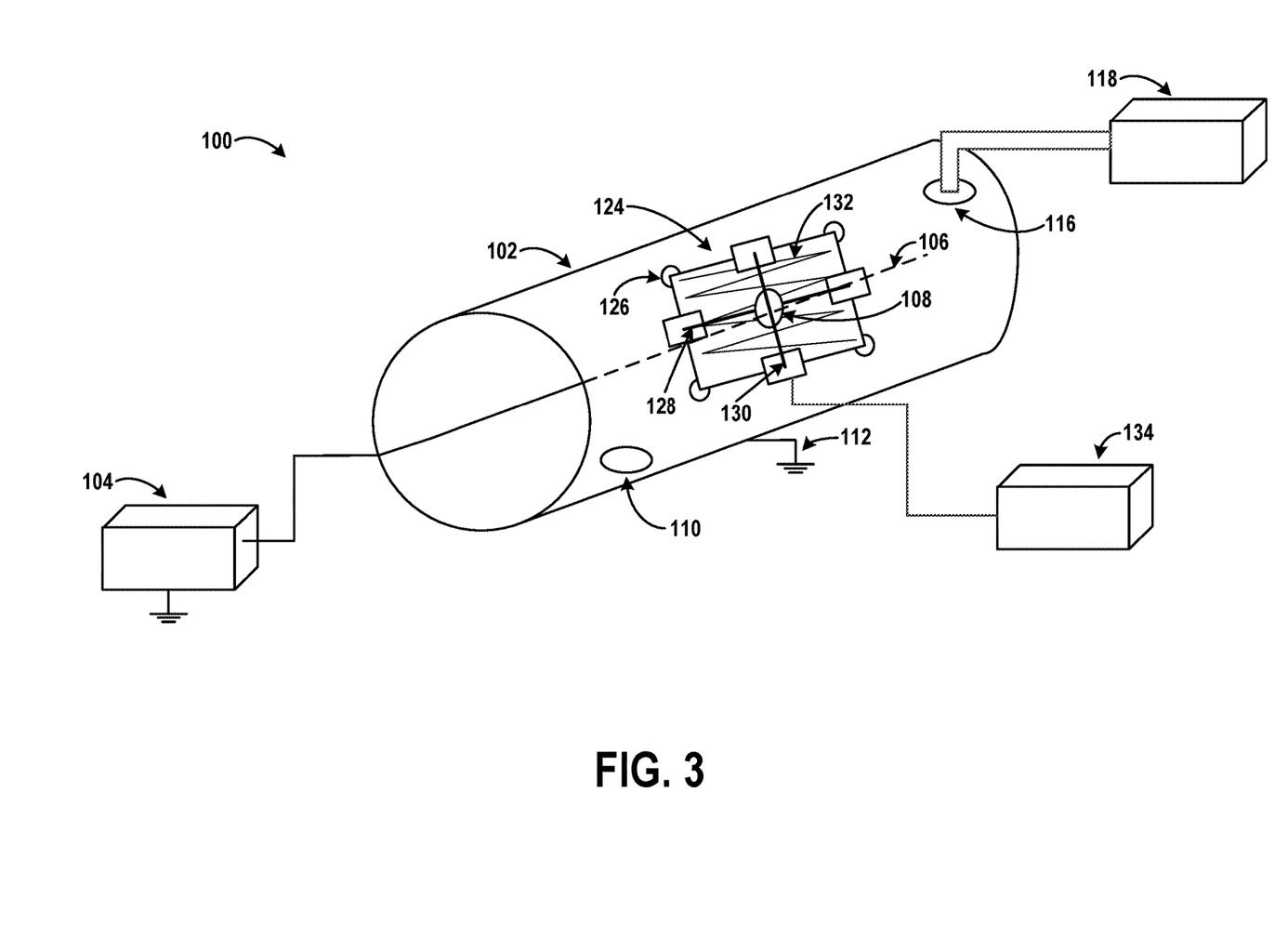
FIG. 3 illustrates another example of the system for plasma cleaning the container, according to an example embodiment.

FIG. 3 illustrates another example of the system 100 for plasma cleaning the container 102, according to an example embodiment. In FIG. 3, a structure 124 holding the magnet 108 is attached to an exterior surface of the container 102. The structure 124 includes one or more suction cups, such as suction cup 126, to attach the structure 124 to the exterior surface of the container 102, and one or more rails 128 and 130 along which the magnet 108 moves. The rail 128 is a horizontal rail and the rail 130 is a vertical rail. The magnet 108 is slidably attached to the rails 128 and 130 to enable the magnet 108 to move up/down and/or left/right so as to slide in a linear motion. The structure 124 allows a zig-zag moving pattern 132 as well by moving horizontally and vertically in a simultaneous manner.

In FIG. 3, a motor 134 is coupled to the structure 124 to cause movement of the magnet 108 within the structure 124 in a motion over the exterior surface of the container 102 to control movement of the plasma within the container 102 and to clean one or more areas of the container 102 with the plasma according to the motion. The motor 134 moves the rails 128 and 130 up/down and/or left/right which causes the magnet 108 to move as well. For example, the motor 134 causes the magnet 108 to slide in a linear motion along the one or more rails 128 and 130. The system 100 shown in FIG. 3 enables the plasma to clean surfaces with an automated motorized magnet directing the plasma cleaning.

Figure 4:
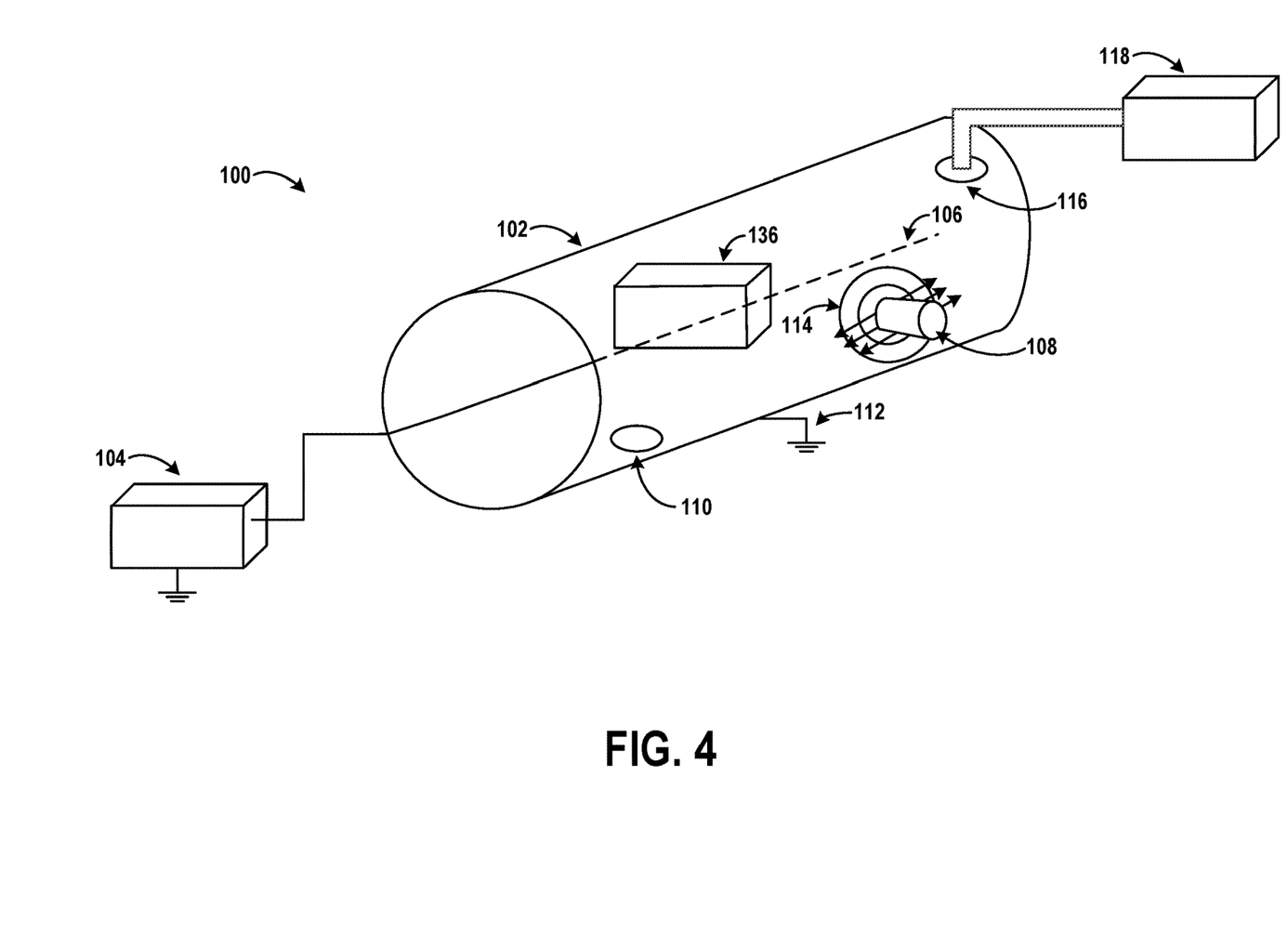
FIG. 4 illustrates another example of the system for plasma cleaning, according to an example embodiment.

FIG. 4 illustrates another example of the system 100 for plasma cleaning, according to an example embodiment. In FIG. 4, an item 136 is inserted into the container 102, and moving the magnet 108 in the motion over the exterior surface of the container 102 to control movement of the plasma within the container 102 both cleans interior surfaces of the container 102 and also cleans one or more areas of the item 136 in the container 102. Thus, the diffuse plasma glow discharge cleaning can be used to clean items in the container 102 as well as interior surfaces of the container 102. Since the plasma glow 114 can be focused by the magnet 108, the plasma glow 114 can be focused onto an area in the container 102 where the item 136 is positioned. The container 102 may then be used as a plasma cleaning box, for example.

Figure 5:
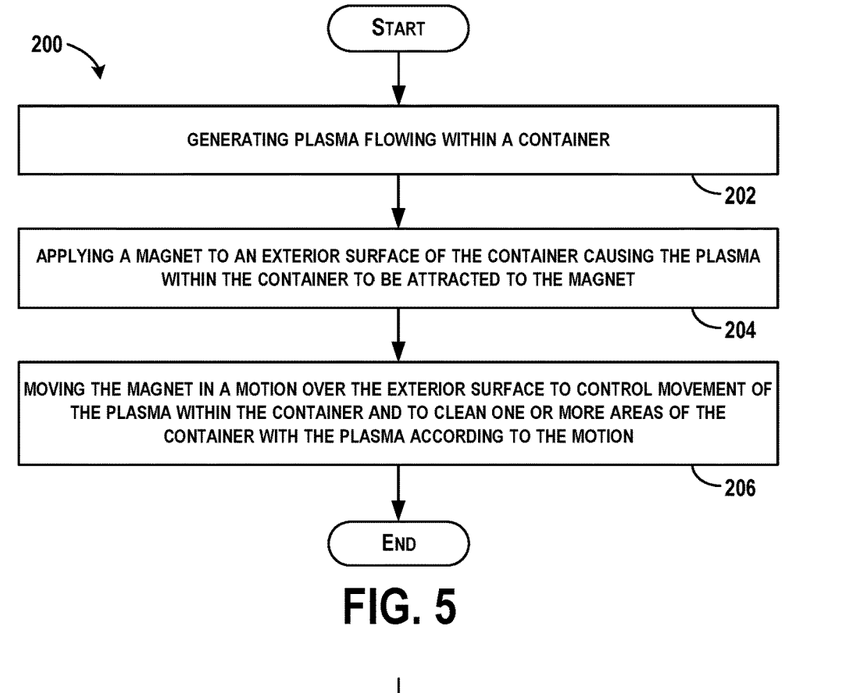
FIG. 5 shows a flowchart of an example method for plasma cleaning the container, according to an example embodiment.

FIG. 5 shows a flowchart of an example method 200 for plasma cleaning the container 102, according to an example embodiment. Method 200 shown in FIG. 5 presents an embodiment of a method that could be used or performed by the system 100 or components of the system 100, shown in FIGS. 1-4, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes generating plasma flowing within the container 102. At block 204, the method 200 includes applying the magnet 108 to an exterior surface of the container 102 causing the plasma within the container 102 to be attracted to the magnet 108. In some examples, the magnet 108 is an electro-magnet, and applying the magnet 108 to the exterior surface of the container 102 is performed such that a magnetic field is perpendicular to the exterior surface of the container 102. The magnet 108 also includes two faces with poles on the two faces, and the magnet is applied to the exterior surface of the container 102 by applying one of the two faces to the exterior surface of the container 102.

In addition, the magnet 108 can be applied to the container 102 through use of the robotic manipulator 120 having the end effector 122 coupled to the magnet 108. Or, in other examples, the magnet can be applied to the exterior surface of the container 102 by attaching the structure 124 holding the magnet 108 to the exterior surface of the container 102. The structure 124 is attached to the exterior surface of the container 102 using one or more suction cups, such as the suction cup 126, and the structure 124 includes the rails 128 and 130 along which the magnet 108 is movable by use of the motor 134 to cause the magnet 108 to slide in a linear motion along the one or more rails 128 and 130.

At block 206, the method 200 includes moving the magnet 108 in a motion over the exterior surface to control movement of the plasma within the container 102 and to clean one or more areas of the container 102 with the plasma according to the motion. In an example the magnet 108 is moved in the motion over the exterior surface to control movement of the plasma on an interior surface of the container 102 to clean the interior surface of the container 102. The magnet 108 can be moved in the motion over the exterior surface in a predefined manner to cover an entire area of the exterior surface.

Figure 6:
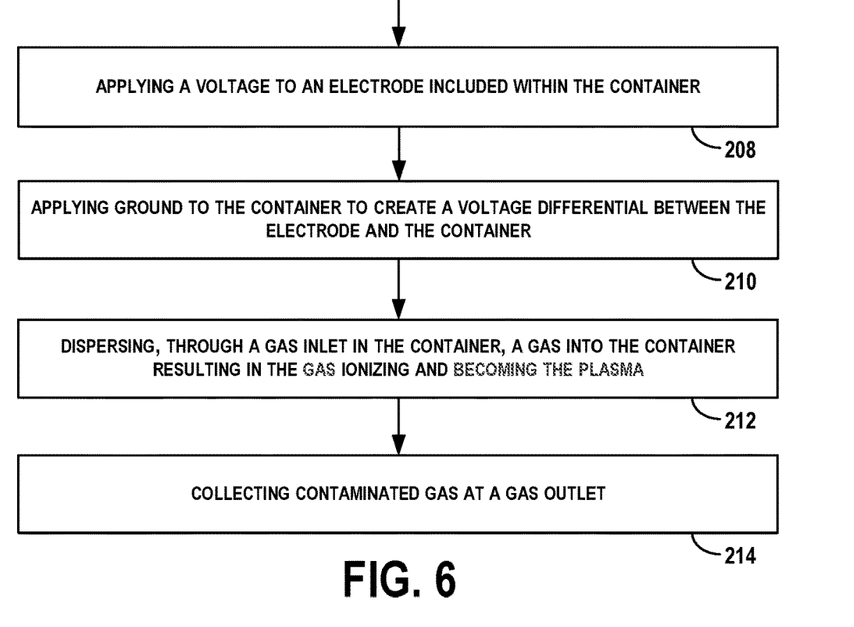
FIG. 6 shows a flowchart of an example method for use with the method shown in FIG. 5, according to an example embodiment.

FIG. 6 shows a flowchart of an example method for use with the method 200 shown in FIG. 5, according to an example embodiment. For example, the flowchart in FIG. 6 illustrates an example method for generating plasma flowing within the container 102. At block 208, additional functions include applying a voltage to the electrode 106 included within the container 102. At block 210, functions include applying the ground 112 to the container 102 to create a voltage differential between the electrode 106 and the container 102. At block 212, functions include dispersing, through the gas inlet 110 in the container 102, a gas into the container 102 resulting in the gas ionizing and becoming the plasma. Within examples, the gas includes a mixture of an inert gas and a reactive gas. At block 214, additional functions include collecting contaminated gas at the gas outlet 116.

Figure 7:
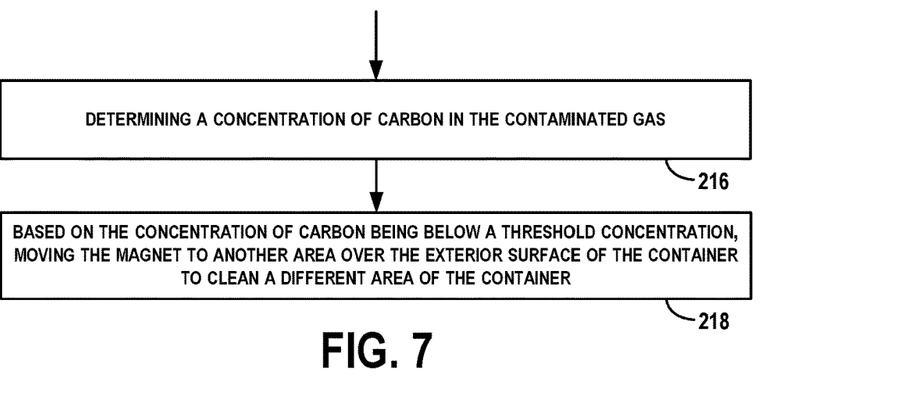
FIG. 7 shows a flowchart of another example method for use with the method shown in FIG. 5, according to an example embodiment.

FIG. 7 shows a flowchart of another example method for use with the method 200 shown in FIG. 5, according to an example embodiment. At block 216, functions include determining a concentration of carbon in the contaminated gas. At block 218, functions include based on the concentration of carbon being below a threshold concentration, moving the magnet 108 to another area over the exterior surface of the container 102 to clean a different area of the container 102.

Figure 8:
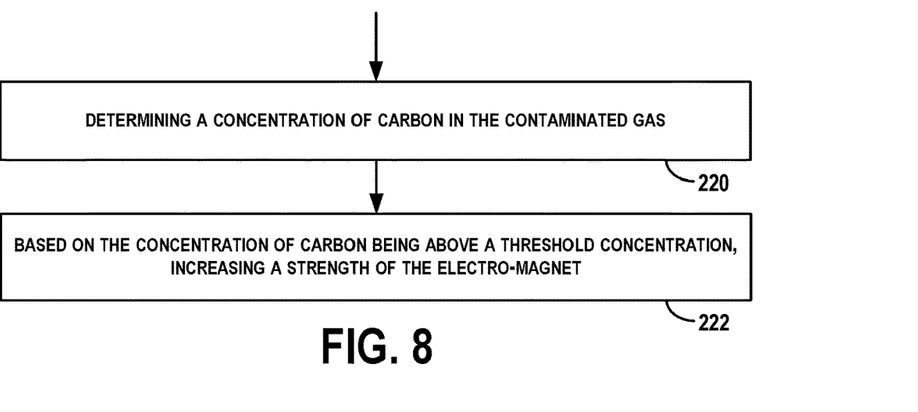
FIG. 8 shows a flowchart of another example method for use with the method shown in FIG. 5, according to an example embodiment.

FIG. 8 shows a flowchart of another example method for use with the method 200 shown in FIG. 5, according to an example embodiment. For example, the flowchart in FIG. 8 illustrates an example method in instances in which the magnet 108 is an electro-magnet. At block 220, functions include determining a concentration of carbon in the contaminated gas. At block 222, functions include based on the concentration of carbon being above a threshold concentration, increasing a strength of the electro-magnet.

Figure 9:
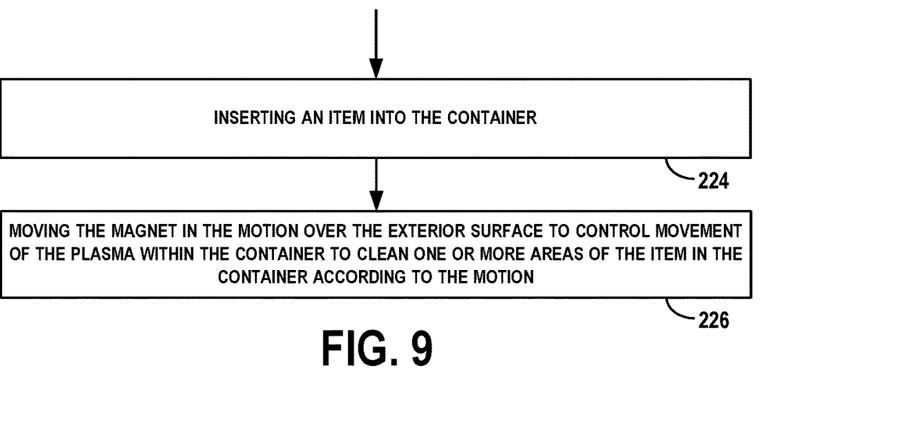
FIG. 9 shows a flowchart of another example method for use with the method shown in FIG. 5, according to an example embodiment.

FIG. 9 shows a flowchart of another example method for use with the method 200 shown in FIG. 5, according to an example embodiment. At block 224, functions include inserting the item 136 into the container 102. At block 226, functions include moving the magnet 108 in the motion over the exterior surface to control movement of the plasma within the container 102 to clean one or more areas of the item in the container 102 according to the motion.

Example benefits that can be achieved through use of example methods and systems described herein include enabling a surface to be cleaned by use of a low power source and scoured in a repetitive motion with an automated or motorized magnet that directs the plasma cleaning back and forth. With such fine control, the plasma can also be directed into areas that traditional diffuse plasma glow discharge cleaning may be unable to access. In addition, magnets of various shapes, sizes, and field strengths can be used to achieve small or large radii of plasma or to scour particularly dirty areas.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for plasma cleaning a container, the method comprising:
   generating a plasma flowing within the container by (i) applying a voltage to an electrode included within the container, (ii) applying ground to the container to create a voltage differential between the electrode and the container, and (iii) dispersing, through a gas inlet in the container, a gas into the container resulting in the gas ionizing and becoming the plasma;
   applying a magnet to an exterior surface of the container causing the plasma within the container to be attracted to the magnet, wherein the magnet is an electro-magnet;
   moving the magnet in a motion over the exterior surface to control movement of the plasma within the container and to clean one or more areas of the container with the plasma according to the motion;
   collecting contaminated gas at a gas outlet;
   determining a concentration of carbon in the contaminated gas; and
   based on the concentration of carbon being above a threshold concentration, increasing a strength of the electro-magnet.

2. The method of claim 1, wherein applying the magnet to the exterior surface of the container comprises applying the magnet such that a magnetic field is perpendicular to the exterior surface of the container.

3. The method of claim 1, further comprising:
based on the concentration of carbon being below a threshold concentration, moving the magnet to another area over the exterior surface of the container to clean a different area of the container.

4. The method of claim 1, wherein the gas includes a mixture of an inert gas and a reactive gas.

5. The method of claim 1, wherein applying the magnet to the exterior surface of the container comprises:
a robotic manipulator having an end effector coupled to the magnet moving the magnet in the motion over the exterior surface.

6. The method of claim 1, wherein applying the magnet to the exterior surface of the container comprises:
attaching a structure holding the magnet to the exterior surface of the container; and
moving the magnet within the structure in a pattern to cause the magnet to move in the motion.

7. The method of claim 6, wherein the structure is attached to the exterior surface of the container using one or more suction cups and the structure includes one or more rails along which the magnet is movable, and wherein the structure is coupled to a motor, and wherein moving the magnet within the structure in the pattern comprises:
operating the motor to cause the magnet to slide in a linear motion along the one or more rails.

8. The method of claim 1, wherein moving the magnet in the motion over the exterior surface to control movement of the plasma within the container comprises:
moving the magnet in the motion over the exterior surface to control movement of the plasma on an interior surface of the container to clean the interior surface of the container.

9. The method of claim 1, wherein moving the magnet in the motion over the exterior surface to control movement of the plasma within the container comprises:
moving the magnet in the motion over the exterior surface in a predefined manner to cover an entire area of the exterior surface.

10. The method of claim 1, wherein the magnet comprises two faces with poles on the two faces, and wherein applying the magnet to the exterior surface of the container comprises:
applying one of the two faces to the exterior surface of the container.

11. The method of claim 1, further comprising:
inserting an item into the container; and
moving the magnet in the motion over the exterior surface to control movement of the plasma within the container to clean one or more areas of the item in the container according to the motion.

12. The method of claim 1, wherein determining the concentration of carbon in the contaminated gas comprises a spectrometer determining the concentration of carbon in the contaminated gas.

13. The method of claim 6, wherein the structure is attached to the exterior surface of the container, and wherein the structure is coupled to a motor, and wherein moving the magnet within the structure in the pattern comprises:
operating the motor to cause movement of the magnet within the structure in a motion over the exterior surface to control movement of the plasma within the container and to clean one or more areas of the container with the plasma according to the motion.

14. The method of claim 1, wherein the container comprises multiple materials, and the method comprises:
cleaning one or more areas of the container based on a material of the container.

15. The method of claim 14, wherein the method comprises:
focusing cleaning on an area of the container comprising titanium.

16. The method of claim 1, further comprising determining the threshold concentration based on a type of the container.

17. The method of claim 1, further comprising:
making a first measurement of the concentration of carbon at the gas outlet at a beginning of a cleaning cycle;
making a second measurement of the concentration of carbon at the gas outlet at an end of the cleaning cycle;
based on the concentration of carbon decreasing from the first measurement to the second measurement, ending the cleaning cycle.

18. The method of claim 1, further comprising:
a spectrometer determining an overall cleanliness of an interior of the container based on a measurement of the concentration of carbon.

19. The method of claim 1, further comprising:
adjusting a strength of the electro-magnet on the fly to provide additional cleaning to compensate for a variation in wall thickness.

20. The method of claim 1, wherein applying the magnet to the exterior surface of the container comprises:
a robotic manipulator having an end effector coupled to the magnet moving the magnet in the motion over the exterior surface; and
based on the concentration of carbon being below a threshold concentration, the robotic manipulator moving the magnet to another area over the exterior surface of the container to clean a different area of the container.

* * * * *